United States Patent
Yamamoto et al.

(10) Patent No.: US 9,954,413 B2
(45) Date of Patent: Apr. 24, 2018

(54) ELECTRIC MOTOR, AIR CONDITIONER, AND ELECTRIC APPARATUS

(71) Applicant: Mitsubishi Electric Corporation, Tokyo (JP)

(72) Inventors: Mineo Yamamoto, Tokyo (JP); Kazunori Sakanobe, Tokyo (JP); Hiroyuki Ishii, Tokyo (JP); Hiroki Aso, Tokyo (JP); Junichiro Oya, Tokyo (JP); Yuto Urabe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 229 days.

(21) Appl. No.: 15/027,722

(22) PCT Filed: Oct. 23, 2014

(86) PCT No.: PCT/JP2014/078265
§ 371 (c)(1),
(2) Date: Apr. 7, 2016

(87) PCT Pub. No.: WO2015/060409
PCT Pub. Date: Apr. 30, 2015

(65) Prior Publication Data
US 2016/0241104 A1    Aug. 18, 2016

(30) Foreign Application Priority Data

Oct. 24, 2013 (JP) .................................. 2013-221454

(51) Int. Cl.
*H02K 5/22* (2006.01)
*H02K 11/00* (2016.01)
(Continued)

(52) U.S. Cl.
CPC ............. *H02K 5/225* (2013.01); *H02K 3/522* (2013.01); *H02K 5/08* (2013.01); *H02K 11/20* (2016.01); *H02K 11/21* (2016.01); *H02K 15/12* (2013.01)

(58) Field of Classification Search
CPC .... H02K 5/225; H02K 11/20; H02K 11/0094; H02K 11/21; H02K 11/22; H02K 11/30; H02K 11/33
(Continued)

(56) References Cited

U.S. PATENT DOCUMENTS 5,160,275 A * 11/1992 Nakamura ............. H01R 12/82
439/267
6,315,620 B1 * 11/2001 Moir ...................... H02K 5/225
439/79
(Continued)

FOREIGN PATENT DOCUMENTS

JP    H03-60867 U    6/1991
JP    2005-261002 A    9/2005
(Continued)

OTHER PUBLICATIONS

International Search Report of the International Searching Authority dated Jan. 20, 2015 for the corresponding international application No. PCT/JP2014/078265 (and English translation).

*Primary Examiner* — Burton Mullins
(74) *Attorney, Agent, or Firm* — Posz Law Group, PLC

(57) ABSTRACT

A power-supply-lead retaining part includes a pair of legs extending toward a bearing through hole, a pair of first locking portions provided on the pair of legs and locked to the edge portion of the bearing through hole, and a pair of second locking portions locked to the edge portion of the sensor substrate on both sides of a notch.

11 Claims, 9 Drawing Sheets

(51) Int. Cl.
  *H02K 3/52* (2006.01)
  *H02K 5/08* (2006.01)
  *H02K 15/12* (2006.01)
  *H02K 11/21* (2016.01)
  *H02K 11/20* (2016.01)

(58) Field of Classification Search
  USPC .......................................................... 310/71
  See application file for complete search history.

(56) References Cited

U.S. PATENT DOCUMENTS

| | | | |
|---|---|---|---|
| 7,696,660 B2 * | 4/2010 | Koike | H01R 12/515 |
| | | | 310/179 |
| 8,272,897 B1 * | 9/2012 | Lin | H01R 13/6594 |
| | | | 439/607.4 |
| 8,410,649 B2 * | 4/2013 | Tanabe | H01R 12/707 |
| | | | 310/71 |
| 2015/0263581 A1 * | 9/2015 | Yamamoto | H02K 29/08 |
| | | | 310/43 |

FOREIGN PATENT DOCUMENTS

| | | | | |
|---|---|---|---|---|
| JP | 2007228667 | * | 9/2007 | ............ H02K 11/00 |
| JP | 4398437 B2 | | 10/2009 | |
| JP | 2010-028909 A | | 2/2010 | |
| JP | 2010-035362 A | | 2/2010 | |
| JP | 2010-273525 A | | 12/2010 | |
| JP | 2013-198218 A | | 9/2013 | |
| JP | 2013215025 | * | 10/2013 | ............... H02K 3/50 |
| WO | 2012008135 | * | 1/2012 | ............... H02K 3/50 |

* cited by examiner (a)  (b)  (c)

(a)  (b)  (c)

(a)  (b)

(a)  (b)  (c)

ELECTRIC MOTOR, AIR CONDITIONER, AND ELECTRIC APPARATUS

CROSS REFERENCE TO RELATED APPLICATIONS

This application is a U.S. national stage application of PCT/JP2014/078265 filed on Oct. 23, 2014, which claims priority to Japanese Patent Application No. 2013-221454 filed on Oct. 24, 2013, the contents of which are incorporated herein by reference.

FIELD

The present invention relates to a stator, an electric motor, and an air conditioner.

BACKGROUND

Conventional molded electric motors are configured such that a sensor-lead board-in connector is attached to one surface of a sensor substrate, sensor leads are routed via the sensor-lead board-in connector, a power-supply-lead board-in connector is attached to the other surface of the sensor substrate, and power supply leads are routed via the power-supply-lead board-in connector (for example, Patent Literature 1).

CITATION LIST

Patent Literature

Patent Literature 1: Japanese Patent Application Laid-open No. 2007-228667

SUMMARY

Technical Problem

The sensor substrate that is used can have a shape having a bearing through hole other than the crescent shape that is applied to the conventional electric motor described in Patent Literature 1.

The present invention has been achieved in view of the above and an object of the present invention is to provide a molded stator, a molded electric motor, and an air conditioner including a lead lead-out portion having a structure that is applied to the sensor substrate provided with a bearing through hole, that is easy to assemble, and that reduces the costs.

Solution to Problem

In order to solve the above problems and achieve the object, a stator according to an aspect of the present invention includes: a sensor substrate attached to one end of a stator core in an axial direction of the stator core, the sensor substrate being provided with a bearing through hole for allowing a bearing of a rotor to pass and being provided with a notch on a periphery, the notch being used for leading out a lead; and a lead retaining part attached to the sensor substrate and retaining the lead, wherein the lead retaining part includes a pair of legs extending toward the bearing through hole, a pair of first locking portions provided on the pair of legs and locked to an edge portion of the bearing through hole, and a pair of second locking portions locked to an edge portion of the sensor substrate on both sides of the notch.

Advantageous Effects of Invention

According to the present invention, an effect is obtained where it is possible to obtain a lead lead-out portion having a structure that is easy to assemble and that reduces the costs.

DESCRIPTION OF EMBODIMENTS

Exemplary embodiments of a stator, an electric motor, and an air conditioner according to the present invention will be explained below in detail with reference to the drawings. This invention is not limited to the embodiments.

First Embodiment

Figure 1:
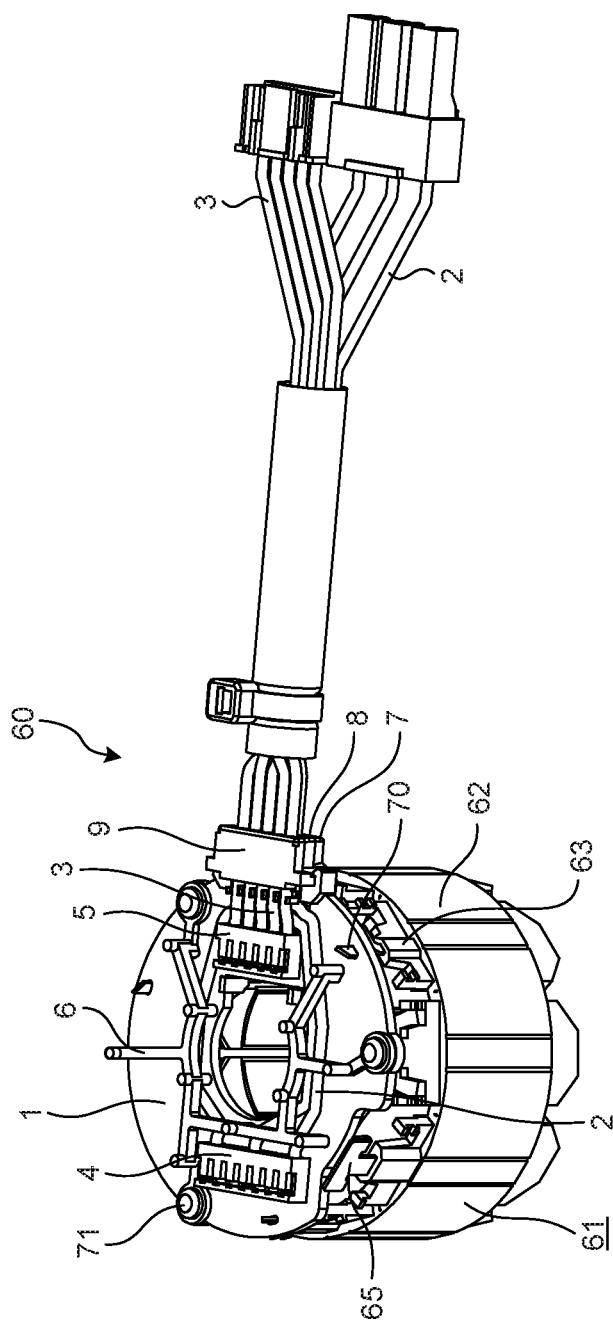
FIG. 1 is a perspective view illustrating the configuration of a stator assembly of an electric motor according to a first embodiment.
Figure 2:
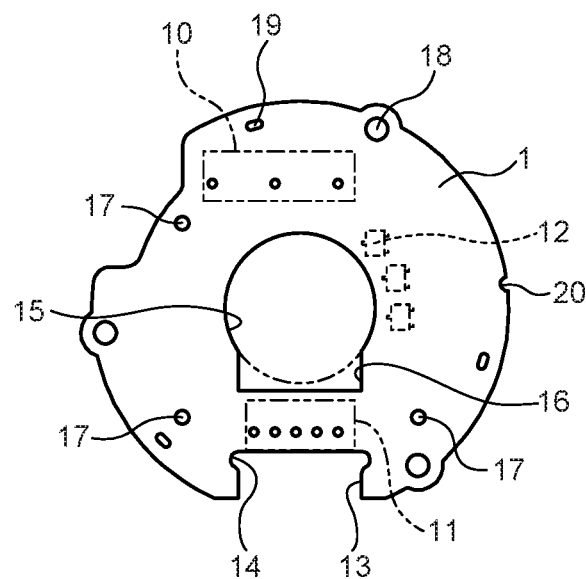
FIG. 2 is a plan view illustrating the configuration of a sensor substrate.
Figure 3:
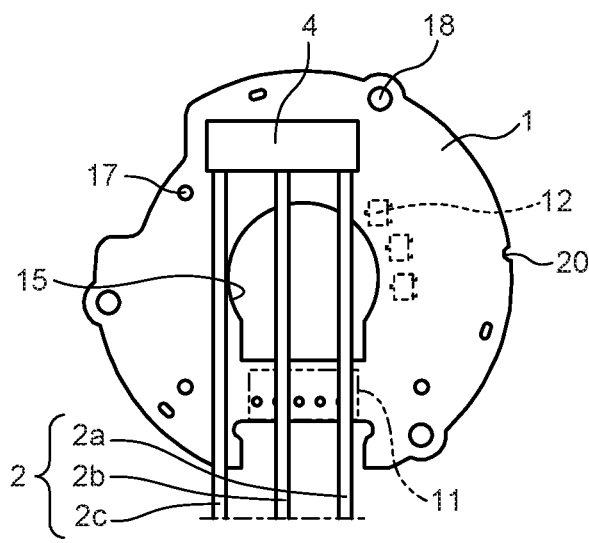
FIG. 3 is a diagram illustrating how a power-supply-lead board-in connector is attached to the sensor substrate.
Figure 4:
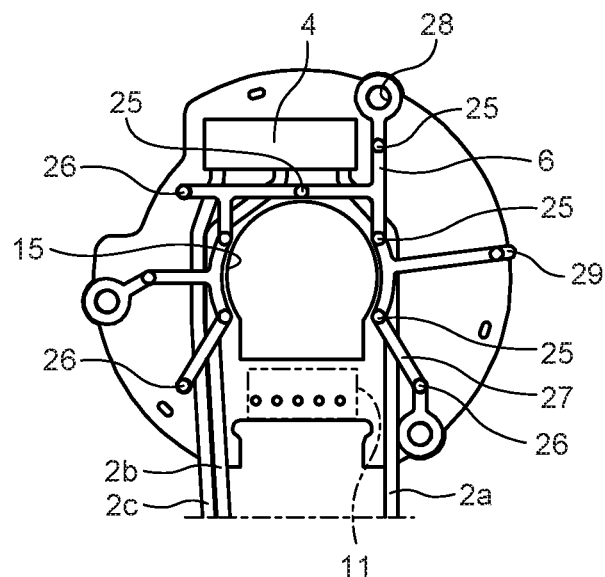
FIG. 4 is a diagram illustrating how a substrate pressing part is attached to the sensor substrate.
Figure 5:
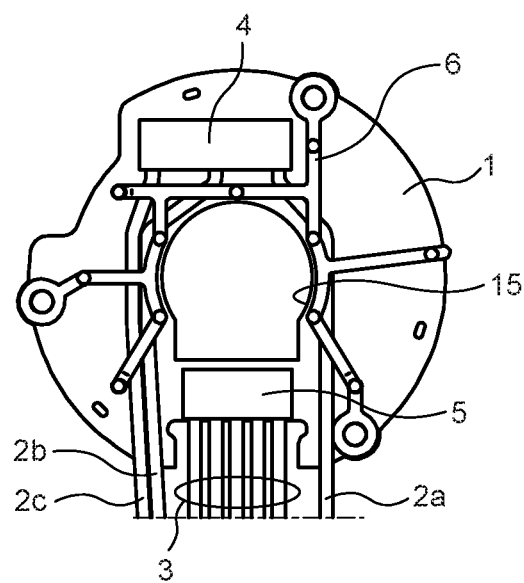
FIG. 5 is a diagram illustrating how a sensor-lead board-in connector is attached to the sensor substrate.
Figure 6:
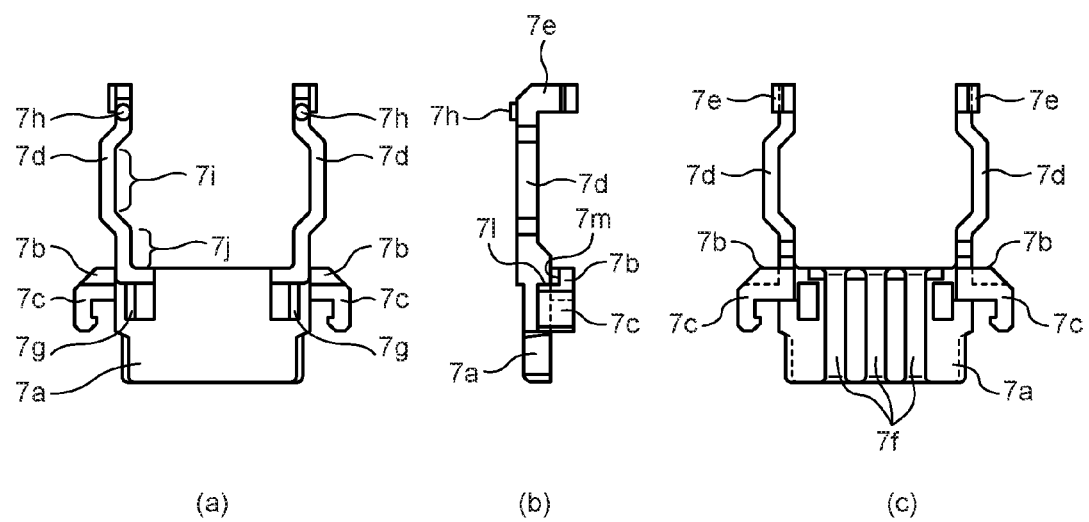
FIG. 6 is a diagram illustrating the configuration of a power-supply-lead retaining part.
Figure 7:
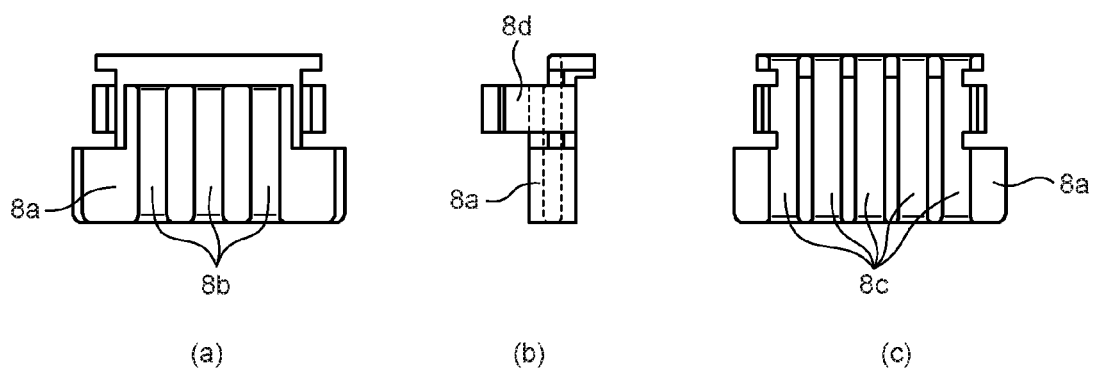
FIG. 7 is a diagram illustrating the configuration of a lead lead-out part.
Figure 8:
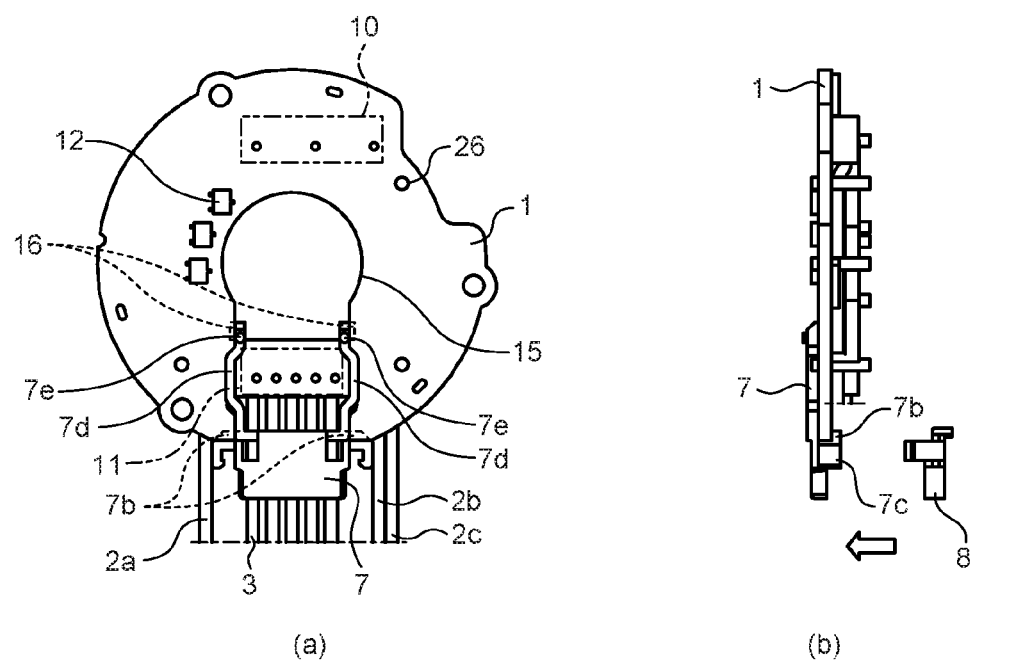
FIG. 8 is a diagram illustrating how the power-supply-lead retaining part is attached to the sensor substrate.
Figure 9:
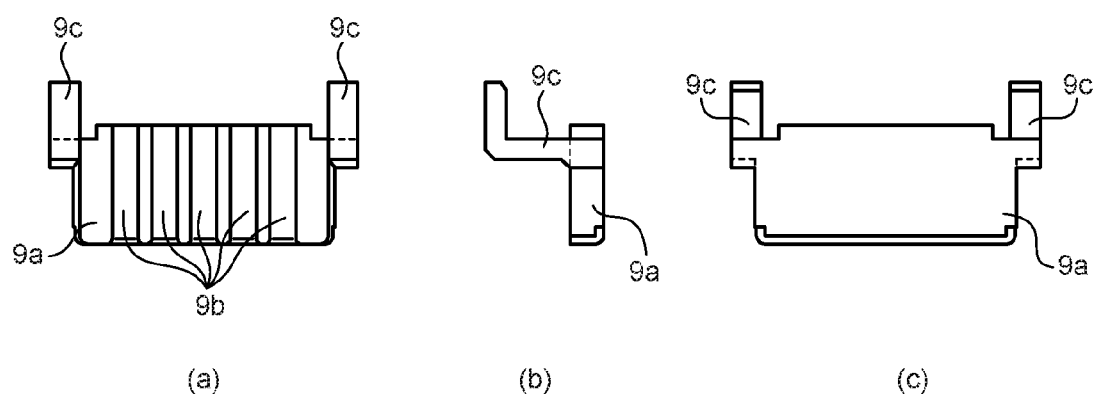
FIG. 9 is a diagram illustrating the configuration of a sensor-lead retaining part.
Figure 10:
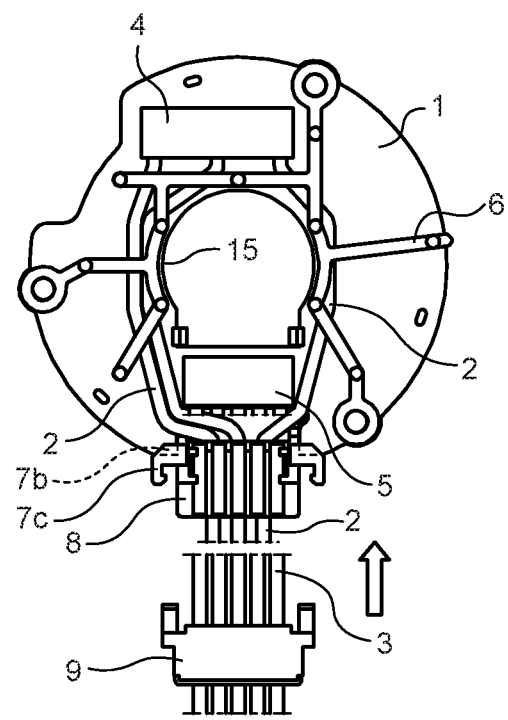
FIG. 10 is a diagram illustrating how the lead lead-out part is attached to the sensor substrate.
Figure 11:
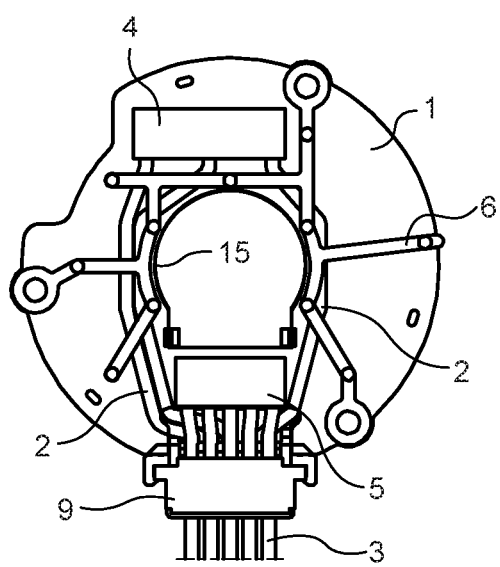
FIG. 11 is a diagram illustrating the sensor substrate on which leads are routed.
Figure 12:
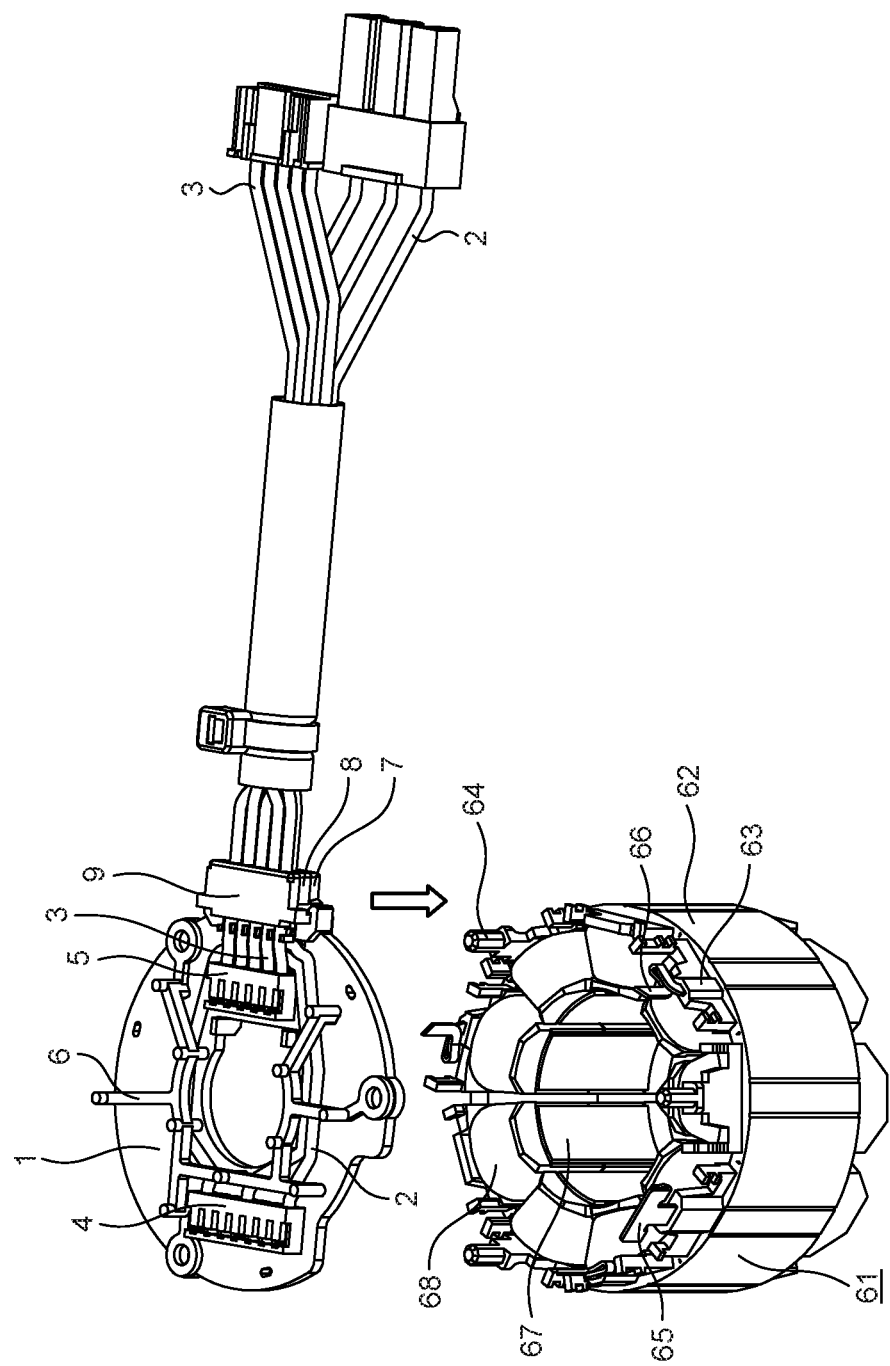
FIG. 12 is a perspective view illustrating how the sensor substrate on which leads are routed is attached to the stator.
Figure 13:
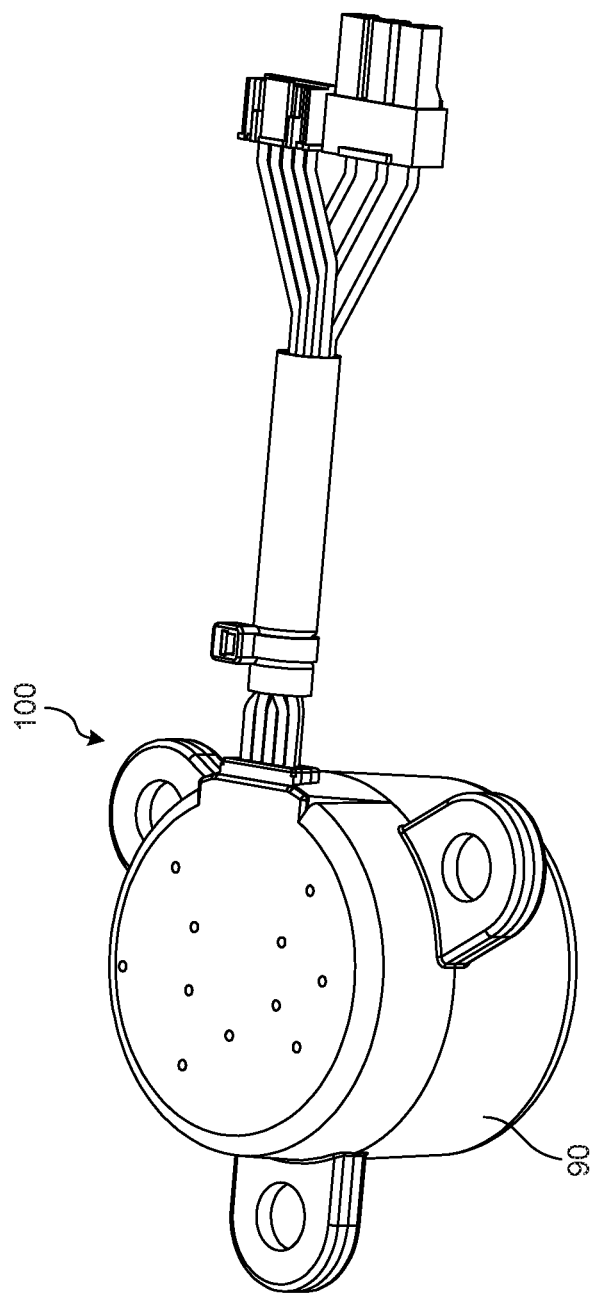
FIG. 13 is a perspective view illustrating a molded stator.
Figure 14:
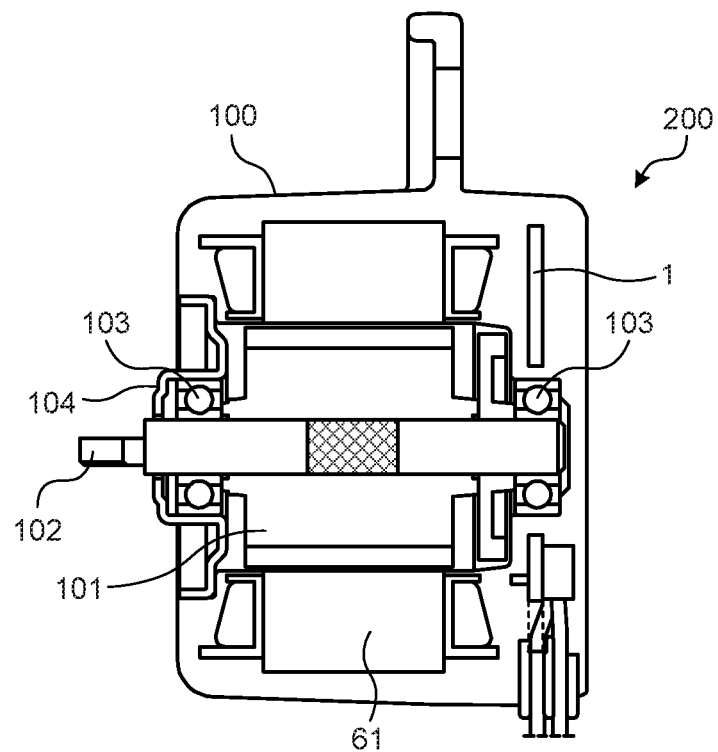
FIG. 14 is a longitudinal cross-sectional view illustrating the configuration of a molded electric motor.

FIG. 1 is a perspective view illustrating the configuration of a stator assembly of an electric motor according to the present embodiment; FIG. 2 is a plan view illustrating the configuration of a sensor substrate; FIG. 3 is a diagram illustrating how a power-supply-lead board-in connector is attached to the sensor substrate; FIG. 4 is a diagram illustrating how a substrate pressing part is attached to the sensor substrate; FIG. 5 is a diagram illustrating how a sensor-lead board-in connector is attached to the sensor substrate; FIG. 6 is a diagram illustrating the configuration of a power-supply-lead retaining part; FIG. 7 is a diagram illustrating the configuration of a lead lead-out part; FIG. 8 is a diagram illustrating how the power-supply-lead retaining part is attached to the sensor substrate; FIG. 9 is a diagram illustrating the configuration of a sensor-lead retaining part; FIG. 10 is a diagram illustrating how the lead lead-out part is attached to the sensor substrate; FIG. 11 is a diagram illustrating the sensor substrate on which leads are routed; FIG. 12 is a perspective view illustrating how the sensor substrate on which leads are routed is attached to the stator; FIG. 13 is a perspective view illustrating a molded stator; and FIG. 14 is a longitudinal cross-sectional view illustrating the configuration of a molded electric motor. The molded stator and the molded electric motor according to the present embodiment will be described below with reference to FIG. 1 to FIG. 14.

A stator assembly 60 includes an annular stator 61; a sensor substrate 1 attached to the stator 61 at one end in the axial direction of the stator 61; a substrate pressing part 6, which is attached to the sensor substrate 1 and presses on the surface of the sensor substrate 1 on the counter-stator side; a power-supply-lead board-in connector 4 attached to the surface of the sensor substrate 1 on the counter-stator side; a sensor-lead board-in connector 5 attached to the surface of the sensor substrate 1 on the counter-stator side in a similar manner to the power-supply-lead board-in connector 4; power supply leads 2 connected to the power-supply-lead board-in connector 4; sensor leads 3 connected to the sensor-lead board-in connector 5; a lead lead-out part 8, which leads out the power supply leads 2 and the sensor leads 3; a power-supply-lead retaining part 7, which is attached to the sensor substrate 1 and the lead lead-out part 8 and retains the power supply leads 2 together with the lead lead-out part 8; and a sensor-lead retaining part 9, which is attached to the power-supply-lead retaining part 7 and retains the sensor leads 3 together with the lead lead-out part 8 (FIG. 1). "Counter-stator side" means the side opposite to the stator side. In the following, "radial direction" means the radial direction of the stator and "axial direction" means the axial direction of the stator.

The stator 61 includes a stator core 62, which is formed by laminating, realized by crimping, welding, bonding, or the like, magnetic steel sheets that are stamped into strips; an insulating portion 63, which is provided on the stator core 62 by molding a thermoplastic resin, such as PBT (polybutylene terephthalate), such that it is integral with the stator core 62 or by attaching the molded thermoplastic resin to the stator core 62; and coils 68, which are magnet wires wound around the insulating portion 63 provided on teeth 67. The sensor substrate 1 is attached to the stator core 62 at one end in the axial direction of the stator core 62.

The insulating portion 63 includes a plurality of pins 64, to which the sensor substrate 1 is attached; a hole into which a neutral point terminal 65 is inserted; and a plurality of holes into which power supply terminals 66 are inserted. The neutral point terminal 65 is formed by stamping out and bending a plate. The neutral point terminal 65 includes two hook portions onto which one end of each of the magnet wires is hooked and it is attached by being inserted into the hole for the neutral point terminal provided in the insulating portion 63. The power supply terminals 66 are formed by bending rectangular wires. The power supply terminals 66 are attached by being inserted into the holes for the power supply terminals provided in the insulating portion 63. The other ends of the magnet wires are hooked onto the hook portions of the power supply terminals 66 and are bonded to the hook portions by fusing or soldering. The stator 61 is obtained by bending the strip-shaped core, from which the stator core 62 around which the coils 68 are wound is configured, into an annular shape and then welding the abutting portions (not illustrated) together.

In the present embodiment, the stator 61 is formed by, after the coils 68 are wound around the magnetic steel sheets that are stamped into strips, shaping the strips into an annular shape; however, the stator core 62 obtained by stamping magnetic steel sheets into an annular shape can also be used.

FIG. 2 illustrates the surface of the sensor substrate 1 on the counter-stator side. The sensor substrate 1 has a doughnut shape (annular shape). A board-in-connector disposing portion 10, on which the power-supply-lead board-in connector 4 is disposed, and a board-in-connector disposing portion 11, on which the sensor-lead board-in connector 5 is disposed, are provided on the surface of the sensor substrate 1 on the counter-stator side. A rotation detection circuit that includes hole ICs 12 for detecting rotation of the rotor of the electric motor is provided on the surface of the sensor substrate 1 on the stator side. A power-supply wiring pattern is formed across both surfaces of the sensor substrate 1.

A notch 13 for leading out leads is provided on a peripheral portion of the sensor substrate 1. The peripheral portion becomes a lead lead-out portion. The notch 13 has, for example, a rectangular shape. In the sensor substrate 1, notches 14 are provided, which further notch both corner portions of the notch 13 on the inner diameter side of the notch 13 (bearing through hole 15 side). In other words, both ends of the notch 13 on the inner diameter side are further notched so as to form the notches 14. Both ends indicate both ends in the direction orthogonal to the radial direction. The notches 14 each have, for example, a semi-circular shape. The notches 14 are formed for the power supply leads 2 to escape therethrough. When the sensor leads 3 are laid on the sensor substrate 1, the power supply leads 2 protrude outwardly relative to the sensor leads 3 in the peripheral direction.

The bearing through hole 15 having a circular shape is provided, for example, at the central position of the sensor substrate 1. The bearing through hole 15 is a hole for allowing a bearing 103 (FIG. 14) of a rotor 101 to pass. The lead lead-out portion side of the bearing through hole 15 is notched, for example, into a rectangular shape. In other words, a notch 16, which communicates with the bearing through hole 15, is provided on the lead lead-out portion side (the notch 13 side) of the bearing through hole 15 in the sensor substrate 1. The notch 16 can be regarded as part of the bearing through hole 15. It is satisfactory if the sensor substrate 1 has a shape provided with the bearing through hole 15 and the sensor substrate 1 may have a shape other than a doughnut shape.

The board-in-connector disposing portion 11 is disposed between the notch 16 and the notch 13 of the sensor substrate 1. The board-in-connector disposing portion 10 is provided such that it faces the board-in-connector disposing portion 11 with the bearing through hole 15 therebetween.

A plurality of pin through holes 18 and a plurality of terminal through holes 19 are provided in the peripheral portion of the sensor substrate 1. The pin through holes 18 are holes into which the pins 64 of the insulating portion 63 are inserted (FIG. 12). The terminal through holes 19 are holes into which the power supply terminals 66 are inserted (FIG. 12). A plurality of pin through holes 17 are formed in the sensor substrate 1. When the substrate pressing part 6 is attached to the sensor substrate 1, pins 26 (FIG. 4) provided on the substrate pressing part 6 are inserted into the pin through holes 17. Furthermore, a notch 20 is formed on the periphery of the sensor substrate 1. When the substrate pressing part 6 is attached to the sensor substrate 1, a leg 29 (FIG. 4) provided on the substrate pressing part 6 is fitted into the notch 20.

In FIG. 3, the power-supply-lead board-in connector 4 is disposed on the board-in-connector disposing portion 10, the terminals (not illustrated) that are exposed from the surface of the sensor substrate 1 on the stator side are soldered, and the power supply leads 2 are connected to the power-supply-lead board-in connector 4. Thus, the sensor substrate 1 and the power supply leads 2 are connected together via the power-supply-lead board-in connector 4. The power supply leads 2 include power supply leads 2a to 2c.

As illustrated in FIG. 4, the power supply leads 2 are routed such that they are separated into one lead (the power supply lead 2a) and two leads (the power supply leads 2b and 2c). Specifically, the power supply leads 2 are routed by attaching the substrate pressing part 6 to the sensor substrate 1 such that one of the three leads (the power supply lead 2a) is routed clockwise around the bearing through hole 15 and the remaining two leads (the power supply leads 2b and 2c) are routed counterclockwise around the bearing through hole 15. The power supply leads 2 may be routed such that one of the three leads (the power supply lead 2a) is routed counterclockwise around the bearing through hole 15 and the remaining two leads (the power supply leads 2b and 2c) are routed clockwise around the bearing through hole 15.

The substrate pressing part 6 includes a plurality of substrate pressing projections 25 disposed on the sensor substrate 1; the pins 26 inserted into the pin through holes 17 in the sensor substrate 1; and a connection part 27, which connects the substrate pressing projections 25 and the pins 26 together. The substrate pressing projections 25 extend toward the sensor substrate 1 and the end surfaces of the substrate pressing projections 25 are in contact with the surface of the sensor substrate 1. There are, for example, six substrate pressing projections 25. There are, for example, three pins 26. The connection part 27 is, for example, shaped as a thin plate.

Each of the substrate pressing projections 25 also includes a projection extending to the counter-stator side. The end surfaces of the projections become a mold contact surface when molding is performed. In a similar manner, each of the pins 26 includes a projection extending to the counter-stator side. The end surfaces of the projections become a mold contact surface when molding is performed.

The substrate pressing part 6 is provided with, at portions that are disposed on the periphery of the sensor substrate 1 when the substrate pressing part 6 is disposed on the sensor substrate 1, a plurality of pin through holes 28 and the leg 29, which is hooked onto the periphery of the sensor substrate 1. In a state where the substrate pressing part 6 is disposed on the sensor substrate 1, the pin through holes 28 communicate with the pin through holes 18 and the pins 64 of the insulating portion 63 are inserted into the pin through holes 28. There are three pin through holes 28 to correspond to the number of the pin through holes 18.

A plurality of (five in the example in FIG. 4) substrate pressing projections 25 are disposed on the periphery of the bearing through hole 15. The power supply leads 2 are guided by the substrate pressing projections 25 and are routed around the periphery of the bearing through hole 15. Thus, the power supply leads 2 can be prevented from sagging into the bearing through hole 15.

Insertion of the pins 26 of the substrate pressing part 6 into the pin through holes 17 in the sensor substrate 1 can prevent the substrate pressing part 6 from being deformed because of the restoring force of the power supply leads 2 and thus the power supply leads 2 can be routed to the predetermined position. Therefore, the manufacturing quality is improved.

The tip portions of the pins 26 that are exposed from the hole IC mounted surface of the sensor substrate 1 by inserting the pins 26 into the pin through holes 17 are thermally welded or bonded; therefore, the substrate pressing part 6 can be prevented from moving in the axial direction (axial direction of the stator 61) and thus the power supply leads 2 can be prevented from being removed. Therefore, the quality can be further improved.

Moreover, as will be described later, when the stator assembly 60 is molded, the end surfaces of the projections of the substrate pressing projections 25 and the pins 26 extending to the counter-stator side are brought into contact with the mold; therefore, the sensor substrate 1 can be prevented from being deformed because of the resin pressure during molding and thus the power supply leads 2 can be prevented from being displaced in the axial direction because of the connection part 27. Therefore, the quality can be improved.

Next, as illustrated in FIG. 5, the sensor-lead board-in connector 5 is disposed on the board-in-connector disposing portion 11 of the sensor substrate 1 and the terminals that are exposed from the surface of the sensor substrate 1 on which the hole ICs 12 are mounted are soldered. Thus, the rotation detection circuit of the sensor substrate 1 and the sensor leads 3 are connected together via the sensor-lead board-in connector 5. At this point, the power supply leads 2 are routed, by using the substrate pressing part 6, to bypass the bearing through hole 15 such that the power supply leads 2 are separated into the power supply lead 2a and the power supply leads 2b and 2c; therefore, a space is ensured between the power supply lead 2a and the power supply leads 2b and 2c. Accordingly, the sensor leads 3 can be routed between the power supply lead 2a and the power supply leads 2b and 2c. Thus, the attaching process of the sensor leads 3 to the sensor-lead board-in connector 5 is facilitated. Therefore, the manufacturing cost is reduced and the manufacturing quality is improved.

Typically, routing of the power supply leads 2 and the sensor leads 3 to the sensor substrate 1 is facilitated by using a board-in connector. However, when the routing space between the bearing through hole 15 and the periphery is limited because of a restriction on the size or the like of the sensor substrate 1, it is difficult in some cases to collectively route all of the three power supply leads 2. In such a case, as described in the present embodiment, the power supply leads 2 are separated into two groups and then routed. This enables routing of the power supply leads 2. When the routing space is not limited, all of the three power supply leads 2 may be collectively routed clockwise or counterclockwise such that they bypass the bearing through hole 15 without separating the power supply leads 2.

The rotation detection circuit including the hole ICs 12 is provided on the sensor substrate 1; therefore, it is difficult in some cases to dispose the power-supply-lead board-in connector 4 on the surface of the sensor substrate 1 on the stator side and route the power supply leads 2. In such a case, the present embodiment is useful. That is, both the power-supply-lead board-in connector 4 and the sensor-lead board-in connector 5 are disposed on the surface of the sensor substrate 1 on which the hole ICs are not mounted (surface on the counter-stator side), and the sensor-lead board-in connector 5 is disposed between the lead lead-out portion (the notch 13) and the bearing through hole 15 to shorten the path along which the sensor leads 3 are routed, i.e., to prevent the sensor leads 3 from being routed along the bearing through hole 15, thereby enabling the power supply leads 2 and the sensor leads 3 to be routed.

Furthermore, in the present embodiment, the power-supply-lead board-in connector 4 is disposed between the bearing through hole 15 and the periphery on the side opposite to the lead lead-out portion of the sensor substrate 1; therefore, distribution of the power supply leads 2 is balanced (except for the difference in number) with respect to the sensor-lead board-in connector 5. Thus, attaching of the sensor-lead board-in connector 5 is facilitated compared with the case where the power-supply-lead board-in connector 4 is disposed in a different location. Therefore, the manufacturing cost is reduced and the manufacturing quality is improved.

FIG. 6(a) is a plan view of the power-supply-lead retaining part 7 when viewed from the stator side; FIG. 6(b) is a side view of the power-supply-lead retaining part 7; and FIG. 6(c) is a plan view of the power-supply-lead retaining part 7 when viewed from the counter-stator side. FIG. 8(a) is a plan view of the sensor substrate 1 to which the power-supply-lead retaining part 7 is attached when viewed from the stator side and FIG. 8(b) is a side view illustrating how the lead lead-out part 8 is attached to the power-supply-lead retaining part 7. As illustrated in FIG. 8, the power-supply-lead retaining part 7 is attached to the lead lead-out portion of the sensor substrate 1.

The power-supply-lead retaining part 7 includes a base portion 7a, which is a power-supply-lead retaining portion; a pair of locking portions 7b, which are locked to the edge portions of the sensor substrate 1 on both sides of the notch 13; a pair of attaching legs 7c for attaching the sensor-lead retaining part 9; a pair of legs 7d, which extend toward the bearing through hole 15; a pair of locking portions 7e, which are locked to the edge portion of the bearing through hole 15; a pair of core-metal-end-surface contact portions 7h, on which the core-metal end surface of a mold is disposed; and a pair of attaching portions 7g for attaching the lead lead-out part 8.

The base portion 7a is planar and includes three grooves 7f for retaining the power supply leads 2 on the surface on the counter-stator side.

The locking portions 7b are respectively provided on both ends of the base portion 7a on the inner diameter side (the bearing through hole 15 side). Specifically, the locking portions 7b are provided such that they protrude outwardly from the both ends, respectively. Both ends of the base portion 7a indicate both ends in the direction orthogonal to the radial direction. The locking portions 7b come into contact with the edge portions of the sensor substrate 1 on both sides of the notch 13. Both sides of the notch 13 indicate both sides in the direction orthogonal to the radial direction. Specifically, the locking portions 7b come into contact with both the peripheral portion of the surface of the sensor substrate 1 on the counter-stator side and the side surface portion of the sensor substrate 1 on both sides of the notch 13, and they are locked to the edge portions of the sensor substrate 1 on both sides of the notch 13 (FIG. 8(b)). FIG. 6(b) illustrates contact surfaces 7l and 7m of the locking portions 7b, which come into contact with the sensor substrate 1. The contact surfaces 7l and 7m form an L-shaped cross section. As illustrated in FIG. 8(b), the locking portions 7b are configured such that the end surfaces thereof on the stator side are flush with the surface of the sensor substrate 1 on the stator side.

The attaching legs 7c extend to the outer diameter side from the locking portions 7b, respectively. As will be described later, after the lead lead-out part 8 is attached to the power-supply-lead retaining part 7, legs 9c of the sensor-lead retaining part 9 are fitted into the space between the attaching legs 7c and the base portion 7a, whereby the sensor-lead retaining part 9 is attached to the power-supply-lead retaining part 7.

The legs 7d extend toward the bearing through hole 15 respectively from both ends of the base portion 7a on the inner diameter side (the bearing through hole 15 side). The locking portions 7e are provided such that they are integral with, for example, the tip portions of the legs 7d. The locking portions 7e are hooked and locked to the notch 16, which extends in the axial direction and is provided in the bearing through hole 15.

The locking portions 7b and 7e are attached to the sensor substrate 1 in such a manner, whereby the power-supply-lead retaining part 7 is attached to the sensor substrate 1.

In a state where the power-supply-lead retaining part 7 is attached to the sensor substrate 1, substrate pressing portions 7i, which are parts of the legs 7d on the side on which the locking portions 7e are provided, are disposed on both sides of the board-in-connector disposing portion 11 and they are in contact with the surface of the sensor substrate 1 on the stator side and presses on the sensor substrate 1 (FIG. 6(a) and FIG. 8). The locking portions 7b and 7e are attached to the sensor substrate 1 and the substrate pressing portions 7i of the legs 7d press on the sensor substrate 1 from the stator side; therefore, the sensor substrate 1 is sandwiched by the locking portions 7b and the substrate pressing portions 7i. Thus, the power-supply-lead retaining part 7 can be prevented from being displaced in the axial direction. Therefore, the manufacturing quality is improved and thus the quality of the product is improved.

In a state where the power-supply-lead retaining part 7 is attached to the sensor substrate 1, fitting portions 7j, which are parts of the legs 7d on the side on which the base portion 7a is provided, are fitted into the notch 13 (FIG. 6(a) and FIG. 8). By fitting the fitting portions 7j of the legs 7d into the notch 13 of the sensor substrate 1, the power-supply-lead retaining part 7 can be prevented from being displaced in the direction orthogonal to the lead lead-out direction (radial direction). Therefore, the manufacturing quality is improved and thus the quality of the product is improved.

The locking portions 7e are disposed in the notch 16, which communicates with the bearing through hole 15. With this configuration, the locking portions 7e are located such that the wiring pattern on the sensor substrate 1 is least hindered. Therefore, this configuration is useful for routing the wiring pattern on the sensor substrate 1.

The core-metal-end-surface contact portions 7h are provided at the tip portions of the legs 7d. As will be described later, the core-metal-end-surface contact portions 7h are portions that come into contact with the core-metal end surface of a mold for the stator 61.

The pair of attaching portions 7g lock a pair of legs 8d of the lead lead-out part 8. Accordingly, the lead lead-out part 8 is attached to the power-supply-lead retaining part 7.

FIG. 7(a) is a plan view of the lead lead-out part 8 when viewed from the stator side, FIG. 7(b) is a side view of the lead lead-out part 8, and FIG. 7(c) is a plan view of the lead lead-out part 8 when viewed from the counter-stator side.

As illustrated in FIG. 7, the lead lead-out part 8 includes a planar base portion 8a and the pair of legs 8d. The legs 8d are provided on both ends of the base portion 8a on the inner diameter side (the bearing through hole 15 side) and extend in the axial direction and toward the stator side.

The base portion 8a is planar and includes a plurality of grooves 8c for retaining the sensor leads 3 on the surface on the counter-stator side and three grooves 8b for retaining the power supply leads 2 on the surface on the stator side. The number of the sensor leads 3 to be drawn out is, for example, two or more, i.e., equal to the number of the grooves 8c.

As illustrated in FIG. 8(b), the lead lead-out part 8 is moved in the direction indicated by the arrow and thus the legs 8d are fitted and locked into the attaching portions 7g of the power-supply-lead retaining part 7, whereby the lead lead-out part 8 is attached to the power-supply-lead retaining part 7.

FIG. 9(a) is a plan view of the sensor-lead retaining part 9 when viewed from the stator side; FIG. 9(b) is a side view of the sensor-lead retaining part 9; and FIG. 9(c) is a plan view of the sensor-lead retaining part 9 when viewed from the counter-stator side. The sensor-lead retaining part 9 includes a base portion 9a, which is a sensor-lead retaining portion, and the pair of legs 9c.

The base portion 9a is planar and includes a plurality of grooves 9b for retaining the sensor leads 3 on the surface on the stator side.

The legs 9c are respectively provided on both ends of the base portion 9a on the inner diameter side (the bearing through hole 15 side) and each have an L-shape that extends to the stator side and then extends to the inner diameter side (the bearing through hole 15 side).

The legs 9c of the sensor-lead retaining part 9 are fitted into the space between the attaching legs 7c and the base portion 7a of the power-supply-lead retaining part 7 to which the lead lead-out part 8 is attached, whereby the sensor-lead retaining part 9 is attached to the power-supply-lead retaining part 7.

In this case, the portions of the legs 9c extending to the inner diameter side (the bearing through hole 15 side) press on the surface of the sensor substrate 1 on the stator side; therefore, the sensor substrate 1 can be prevented from being displaced in the axial direction. Therefore, the manufacturing quality is improved and thus the quality of the product is improved.

As illustrated in FIG. 10, after the power supply leads 2 are routed from the power-supply-lead board-in connector 4 to the notches 14 for the power supply leads to escape therethrough such that they bypass the bearing through hole 15, the power supply leads 2 pass through the notches 14 for the power supply leads to escape therethrough, are routed between the legs 7d of the power-supply-lead retaining part 7 on the stator side of the sensor substrate 1, and are retained such that they are sandwiched between the base portion 8a of the lead lead-out part 8 and the base portion 7a of the power-supply-lead retaining part 7 so as to be drawn out from the lead lead-out portion.

Furthermore, the sensor leads 3 are drawn out linearly in the radial direction from the sensor-lead board-in connector 5 toward the lead lead-out portion.

The notches 14 for the power supply leads to escape therethrough are disposed outside the range that is occupied by the sensor lead 3 group. In other words, the length between the notches 14 is larger than the width occupied by the sensor lead 3 group and thus the notches 14 are disposed outside the range that is occupied by the sensor lead 3 group in a state where the sensor lead 3 group is routed. Accordingly, the power supply leads 2 can pass through the notches 14 without being hindered by the sensor lead 3 group. With such a configuration, routing of the power supply leads 2 is facilitated. Therefore, the manufacturing cost is reduced.

The power supply leads 2 can be routed by setting the notch 13 in the lead lead-out portion to be larger than the width occupied by the sensor lead 3 group. However, for example, when the notch 13 cannot be made large because the sensor substrate 1 is small or when the lead lead-out part 8 needs to be made as small as possible, provision of the notches 14 for the power supply leads to escape therethrough is effective.

In the present embodiment, the power supply leads 2 are routed such that they are separated into two groups. Accordingly, the notches 14 for the power supply leads to escape therethrough are provided on both sides of the notch 13 in the lead lead-out portion. However, when all of the three power supply leads 2 are collectively routed clockwise or counterclockwise, it is satisfactory if the notch 14 for the power supply leads to escape therethrough is provided only on one side of the notch 13.

As illustrated in FIG. 11, when viewed in plan from the counter-stator side, the sensor leads 3 are laid on the power supply leads 2, which are routed to the stator side of the sensor substrate 1 via the notches 14 for the power supply leads to escape therethrough. With such a configuration, the movement of the power supply leads 2 in the axial direction is restricted by the sensor leads 3 in the lead lead-out portion; therefore, the power supply leads 2 can be prevented from being exposed to the outside when molding is performed. Therefore, the manufacturing quality is improved.

Furthermore, the legs 9c of the sensor-lead retaining part 9 are fitted into the space between the attaching legs 7c and the base portion 7a of the power-supply-lead retaining part 7 by moving the sensor-lead retaining part 9 in the direction indicated by the arrow in FIG. 10, thereby attaching the sensor-lead retaining part 9 to the power-supply-lead retaining part 7. Accordingly, the sensor leads 3 are retained such that they are sandwiched between the lead lead-out part 8 and the sensor-lead retaining part 9 and the sensor leads 3 are drawn out from the lead lead-out portion.

In such a manner, attachment of the power supply leads 2 and the sensor leads 3 to the sensor substrate 1 is completed (FIG. 11).

As illustrated in FIG. 12, the sensor substrate 1 to which the power supply leads 2 and the sensor leads 3 are attached is attached to the stator 61. When being attached, the pins 64 of the insulating portion 63 are inserted into the pin through holes 18 (FIG. 2) in the sensor substrate 1 and the pin through holes 28 (FIG. 4) in the substrate pressing part 6 so as to be positioned. When the sensor substrate 1 is disposed, the power supply terminals 66 attached to the insulating portion 63 are inserted into the terminal through holes 19 (FIG. 2) in the sensor substrate 1. Then, the pins 64 exposed from the substrate pressing part 6 are thermally welded (welded portions 71 in FIG. 1) and furthermore, the power supply terminals 66 exposed from the sensor substrate 1 are soldered (soldered portions 70 in FIG. 1), whereby the stator assembly 60 in which the sensor substrate 1 is attached illustrated in FIG. 1 is completed.

FIG. 13 illustrates the outline of a molded stator 100. The molded stator 100 is obtained by setting the stator assembly 60 (FIG. 1) in a mold and molding the molded stator 100 from a mold resin, such as BMC (Bulk Molding Compound). In other words, the molded stator 100 includes a mold resin portion 90 covering the stator 61.

When the stator assembly 60 is set in the mold, the core-metal-end-surface contact portions 7h provided on the legs 7d of the power-supply-lead retaining part 7 come into contact with the end surface of the metal core of the mold and moreover the end surfaces of the projections of the substrate pressing projections 25 and the pins 26 of the substrate pressing part 6 extending to the counter-stator side come into contact with the end surface of the mold that is opposite to the openings of the mold. Accordingly, the sensor substrate 1 can be prevented from being deformed because of the resin pressure during molding. Therefore, the quality can be improved.

FIG. 14 illustrates the configuration of a molded electric motor 200 in cross section. The molded electric motor 200 includes the rotor 101, which includes a shaft 102; the bearings 103 attached to the shaft 102; the molded stator 100; and a bracket 104 press-fitted into the molded stator 100. FIG. 14 also illustrates components of the molded stator 100, such as the stator 61 and the sensor substrate 1. In the present embodiment, an explanation has been given of the molded stator 100 and the molded electric motor 200; however, the present embodiment can be applied to the stator 61 that is not molded and an electric motor that includes the stator 61 that is not molded.

As described above, according to the present embodiment, the power-supply-lead retaining part 7 includes the pair of legs 7d, which extend toward the bearing through hole 15; the pair of locking portions 7e provided on the pair of legs 7d and locked to the edge portion of the bearing through hole 15; and the pair of locking portions 7b, which are locked to the edge portions of the sensor substrate 1 on both sides of the notch 13.

With such a configuration, the power-supply-lead retaining part 7 can be easily attached to the sensor substrate 1. Therefore, it is possible to obtain a lead lead-out portion having a structure that is easy to assemble and that reduces the costs.

In the present embodiment, the power-supply-lead retaining part 7 includes the pair of legs 7d, the pair of locking portions 7e, and the pair of locking portions 7b; however, the sensor-lead retaining part 9 may include the pair of legs 7d, the pair of locking portions 7e, and the pair of locking portions 7b. Moreover, in the present embodiment, the pair of legs 7d, the pair of locking portions 7e, and the pair of locking portions 7b are provided; however, the configuration may be such that only any one of the legs 7d of the pair, only any one of the locking portions 7e of the pair, and only any one of the locking portions 7b of the pair are provided.

The structure of the power-supply-lead retaining part 7 is applied to the sensor substrate 1 that includes the bearing through hole 15 and the notches 13 and 16, and this structure can be applied regardless of the locations at which the power-supply-lead board-in connector 4 and the sensor-lead board-in connector 5 are disposed. For example, even when the power-supply-lead board-in connector 4 is disposed on the surface of the sensor substrate 1 on the stator side and the sensor-lead board-in connector 5 is disposed on the surface of the sensor substrate 1 on the counter-stator side, the above structure can be applied as long as the power supply leads 2 and the sensor leads 3 can be routed.

Moreover, in the present embodiment, the sensor substrate 1 provided with the bearing through hole 15 is attached to one end of the stator 61; the sensor-lead board-in connector 5 is disposed between the bearing through hole 15 and the notch 13 on the surface of the sensor substrate 1 on the counter-stator side; and the power-supply-lead board-in connector 4 is disposed at a position facing the sensor-lead board-in connector 5 with the bearing through hole 15 therebetween on the surface of the sensor substrate 1 on the counter-stator side.

With such a configuration, even when the outer diameter of the stator 61 is small and the size of the sensor substrate 1 is restricted, and thus, for example, it is difficult to dispose the power-supply-lead board-in connector 4 on the surface of the sensor substrate 1 on the stator side, the power supply leads 2 and the sensor leads 3 can still be routed.

Furthermore, the sensor leads 3 are routed linearly to the lead lead-out portion, whereas the power supply leads 2 are routed such that they bypass the bearing through hole 15; therefore, routing of the power supply leads 2 and the sensor leads 3 is facilitated.

Therefore, according to the present embodiment, routing is facilitated, the costs are reduced, and lead routing is realized that can be applied regardless of the outer diameter of the stator.

Other effects of the present embodiment are as already described with the description of the configuration.

Lead routing inclusive of the structure of the lead lead-out portion described in the present embodiment can also be applied to the configuration in which a stator is not molded. In other words, the present embodiment can also be applied to a stator that is not molded and an electric motor that includes the stator that is not molded. Furthermore, it is possible to provide electric apparatuses in which such an electric motor is installed.

Second Embodiment

Figure 15:
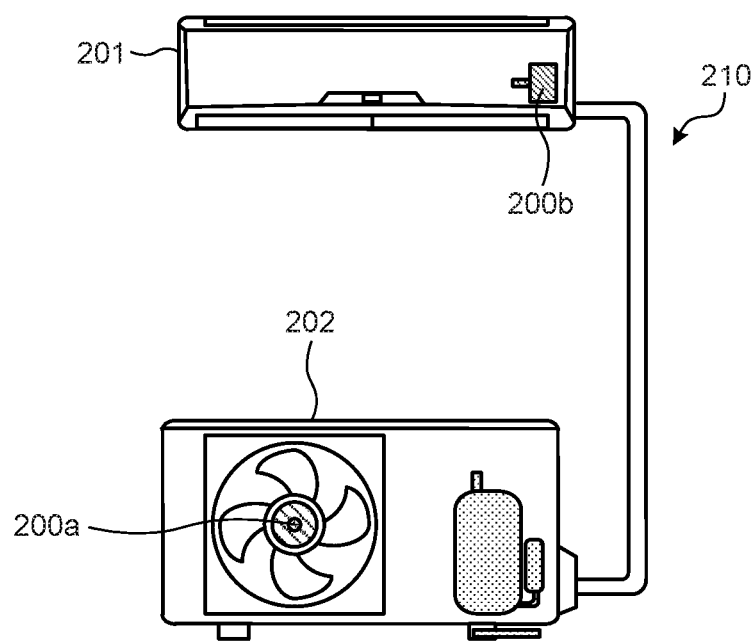
FIG. 15 is a diagram illustrating an example of the configuration of an air conditioner according to a second embodiment.

FIG. 15 is a diagram illustrating an example of the configuration of an air conditioner according to the present embodiment. An air conditioner 210 according to the present embodiment includes an indoor unit 201 and an outdoor unit 202 connected to the indoor unit 201. The outdoor unit 202 includes an air blower in which a molded electric motor 200a is installed. The indoor unit 201 also includes an air blower in which a molded electric motor 200b is installed. The molded electric motors 200a and 200b are both molded electric motors described in the first embodiment.

According to the present embodiment, by installing, in the air conditioner 210, the electric motor in the first embodiment, which is low in cost, is of good quality, is easily routed, and realizes easy lead routing, the cost of the air conditioner 210 can be reduced and the quality of the air conditioner 210 can be improved.

The electric motor in the first embodiment can also be installed in electric apparatuses other than the air conditioner. Even in such a case, effects similar to those in the present embodiment can be obtained.

INDUSTRIAL APPLICABILITY

The present invention is useful as a stator, an electric motor, and an air conditioner.

REFERENCE SIGNS LIST 1 sensor substrate, 2, 2a to 2c power supply lead, 3 sensor lead, 4 power-supply-lead board-in connector, 5 sensor-lead board-in connector, 6 substrate pressing part, 7 power-supply-lead retaining part, 7a base portion, 7b, 7e locking portion, 7c attaching leg, 7d leg, 7f groove, 7g attaching portion, 7h core-metal-end-surface contact portion, 7i substrate pressing portion, 7j fitting portion, 7l, 7m contact surface, 8 lead lead-out part, 8a base portion, 8b, 8c groove, 8d leg, 9 sensor-lead retaining part, 9a base portion, 9b groove, 9c leg, 10, 11 board-in-connector disposing portion, 12 hole IC, 13, 14, 16, 20 notch, 15 bearing through hole, 17, 18, 28 pin through hole, 19 terminal through hole, 25 substrate pressing projection, 26 pin, 27 connection part, 29 leg, 60 stator assembly, 61 stator, 62 stator core, 63 insulating portion, 64 pin, 65 neutral point terminal, 66 power supply terminal, 67 teeth, 68 coil, 70 soldered portion, 71 welded portion, 90 mold resin portion, 100 molded stator, 101 rotor, 102 shaft, 103 bearing, 104 bracket, 200, 200a, 200b molded electric motor, 201 indoor unit, 202 outdoor unit, 210 air conditioner.

The invention claimed is:

1. An electric motor comprising:
a sensor substrate attached to one end of a stator core in an axial direction of the stator core, the sensor substrate being provided with a bearing through hole for allowing a bearing of a rotor to pass and being provided with a notch on a periphery, the notch being used for leading out a lead; and
a lead retaining part attached to the sensor substrate and retaining the lead, wherein
the lead retaining part includes
a leg extending toward the bearing through hole,
a first locking portion provided on the leg and locked to an edge portion of the bearing through hole, and
a second locking portion locked to an edge portion of the notch.

2. The electric motor according to claim 1, wherein the leg includes a substrate pressing portion that comes into contact with a surface on a stator core side of the sensor substrate and presses on the surface.

3. The electric motor according to claim 2, wherein the leg includes a fitting portion that is fitted into the notch.

4. The electric motor according to claim 3, wherein
the lead is a power supply lead,
the lead retaining part is a power-supply-lead retaining part,
the notch is used also for leading out a sensor lead,
a sensor-lead board-in connector to which the sensor lead is connected and a power-supply-lead board-in connector to which the power supply lead is connected are disposed on the sensor substrate,
the sensor-lead board-in connector is disposed between the bearing through hole and the notch on the surface on an opposite side of the stator core side of the sensor substrate, and
the power-supply-lead board-in connector is disposed on the surface on an opposite side of the stator core side of the sensor substrate such that the power-supply-lead board-in connector faces the sensor-lead board-in connector with the bearing through hole therebetween.

5. The electric motor according to claim 4, wherein the power supply lead is separated into two groups and routed to the notch along a periphery of the bearing through hole.

6. The electric motor according to claim 5, further comprising a substrate pressing part attached to the surface on an opposite side of the stator core side of the sensor substrate, the substrate pressing part including a plurality of substrate pressing projections that come into contact with the sensor substrate and press on the sensor substrate, wherein
the power supply lead is routed by being guided by the substrate pressing projections disposed on the periphery of the bearing through hole.

7. The electric motor according to claim 6, wherein the substrate pressing part includes a plurality of pins that are inserted into a plurality of pin through holes provided in the sensor substrate.

8. The electric motor according to claim 5, further comprising a pair of notches for the power supply lead to escape therethrough on a bearing through hole side of the notch and on both ends of the notch in a direction orthogonal to a radial direction of the stator core, wherein
the power supply lead is routed from the power-supply-lead board-in connector to the notches for the power supply lead to escape therethrough such that the power supply lead bypasses the bearing through hole and is then routed to the stator core side of the sensor substrate through the notches for the power supply lead to escape therethrough, and
when viewed in plan from a side opposite to the stator core side, the sensor lead is laid on the power supply lead that is routed to the stator core side of the sensor substrate via the notches for the power supply lead to escape therethrough.

9. The electric motor according to claim 8, wherein
a plurality of sensor leads are connected to the sensor-lead board-in connector,
a length between the notches for the power supply lead to escape therethrough is larger than a width occupied by the sensor leads, and
the notches for the power supply lead to escape therethrough are disposed outside a range that is occupied by the sensor leads.

10. An air conditioner comprising the electric motor according to claim 1.

11. An electric apparatus comprising the electric motor according to claim 1.

* * * * *